(12) United States Patent
Le et al.

(10) Patent No.: US 6,324,640 B1
(45) Date of Patent: Nov. 27, 2001

(54) SYSTEM AND METHOD FOR DISPATCHING GROUPS OF INSTRUCTIONS USING PIPELINED REGISTER RENAMING

(75) Inventors: Hung Qui Le; Hoichi Cheong, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/108,160

(22) Filed: Jun. 30, 1998

(51) Int. Cl.[7] .................................................... C06F 9/00
(52) U.S. Cl. ..................... 712/217; 712/228; 712/215; 712/212
(58) Field of Search ............................... 712/228, 217, 712/215, 212, 23

(56) References Cited

U.S. PATENT DOCUMENTS

| | | | |
|---|---|---|---|
| 5,481,683 | * | 1/1996 | Karim .................................. 712/217 |
| 5,745,780 | * | 4/1998 | Phillips et al. ........................ 712/23 |
| 5,809,268 | * | 9/1998 | Chan ..................................... 712/200 |
| 5,826,070 | * | 10/1998 | Olson et al. .......................... 712/222 |
| 5,850,533 | * | 12/1998 | Panwar et al. ........................ 712/216 |
| 5,974,524 | * | 10/1999 | Cheong et al. ....................... 712/23 |
| 6,035,394 | * | 3/2000 | Ray et al. ............................. 712/245 |

* cited by examiner

*Primary Examiner*—Thomas Lee
*Assistant Examiner*—Gautam R. Patel
(74) *Attorney, Agent, or Firm*—Kelly K. Kordzik; Winstead Sechrest & Minick P.C.; Anthony V. S. England

(57) ABSTRACT

Within a superscalar processor, multiple groups of instructions are dispatched simultaneously to a plurality of execution units. A renaming mechanism is utilized to permit out-of-order execution of these instructions within the multiple groups. The renaming mechanism includes a rename table allocated for each dispatched group. A delay register is implemented between a portion of the dispatch queue dispatching a second one of the groups of instructions and a second one of the rename tables.

14 Claims, 8 Drawing Sheets

| FIG. 6A | FIG. 6B |

SYSTEM AND METHOD FOR DISPATCHING GROUPS OF INSTRUCTIONS USING PIPELINED REGISTER RENAMING

TECHNICAL FIELD

The present invention relates in general to data processing systems, and in particular, to the dispatching of instructions to execution units within a processor.

BACKGROUND INFORMATION

Contemporary computing systems seek to take advantage of superscalar architectures to improve processing performance. Superscalar architectures are characterized by multiple and concurrently operable execution units integrated through a plurality of registers and control mechanisms. This permits the architecture to execute multiple instructions in an out-of-order sequence, thus utilizing parallelism to increase the throughput of the system.

Although superscalar architectures provide benefits in improving processor performance, there are numerous difficulties involved in developing practical systems. For example, control mechanisms must manage dependencies among the data being concurrently processed by the multiple execution units. Another problem is that of mispredicted branches. When instructions are being executed out-of-order, the processor may predict the outcome of an instruction that could result in a branch in program flow. Otherwise, the processor would have to wait, or stall, until the branching instruction completed. This would reduce the effectiveness of out-of-order execution, since the benefits of parallel execution would be countered by delays in instruction issue each time an instruction is dispatched that could result in a branch. Of course, if a branch is mispredicted, then the processor must have the ability to recover the state immediately prior to the branch so that the error can be corrected.

A variety of techniques have been devised to address these difficulties. One particular technique is referred to as "register renaming." Register renaming involves forming an association between a physical register in the processor and a particular architectural, or logical, register. This relationship is referred to as a "rename pair," and is created each time an instruction writes to an architectured register. Such a renaming scheme is further disclosed in U.S. Pat. No. 6,061,777, which is hereby incorporated by reference herein.

Nevertheless, such superscalar architectures are still limited to the dispatching of a few instructions at a time to the execution units. Since such dispatching of instructions on an instruction-by-instruction basis requires a supporting control structure, there is still room for improvement in the reduction of cycle time needed for executing instructions. Therefore, there is a need in the art for an improved and more efficient method for dispatching instructions to execution units within a superscalar processor.

SUMMARY OF THE INVENTION

The present invention addresses the foregoing need by dispatching instructions in groups. In one embodiment, two or more groups can be dispatched in a processor cycle. A renaming scheme is then utilized to enable the processor to return to a previous state when a mispredicted branch or some other type of interrupt requires this process. To implement this renaming scheme a plurality of rename tables, or mappers, and corresponding supporting structures are utilized to handle the plurality of groups of instructions dispatched.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
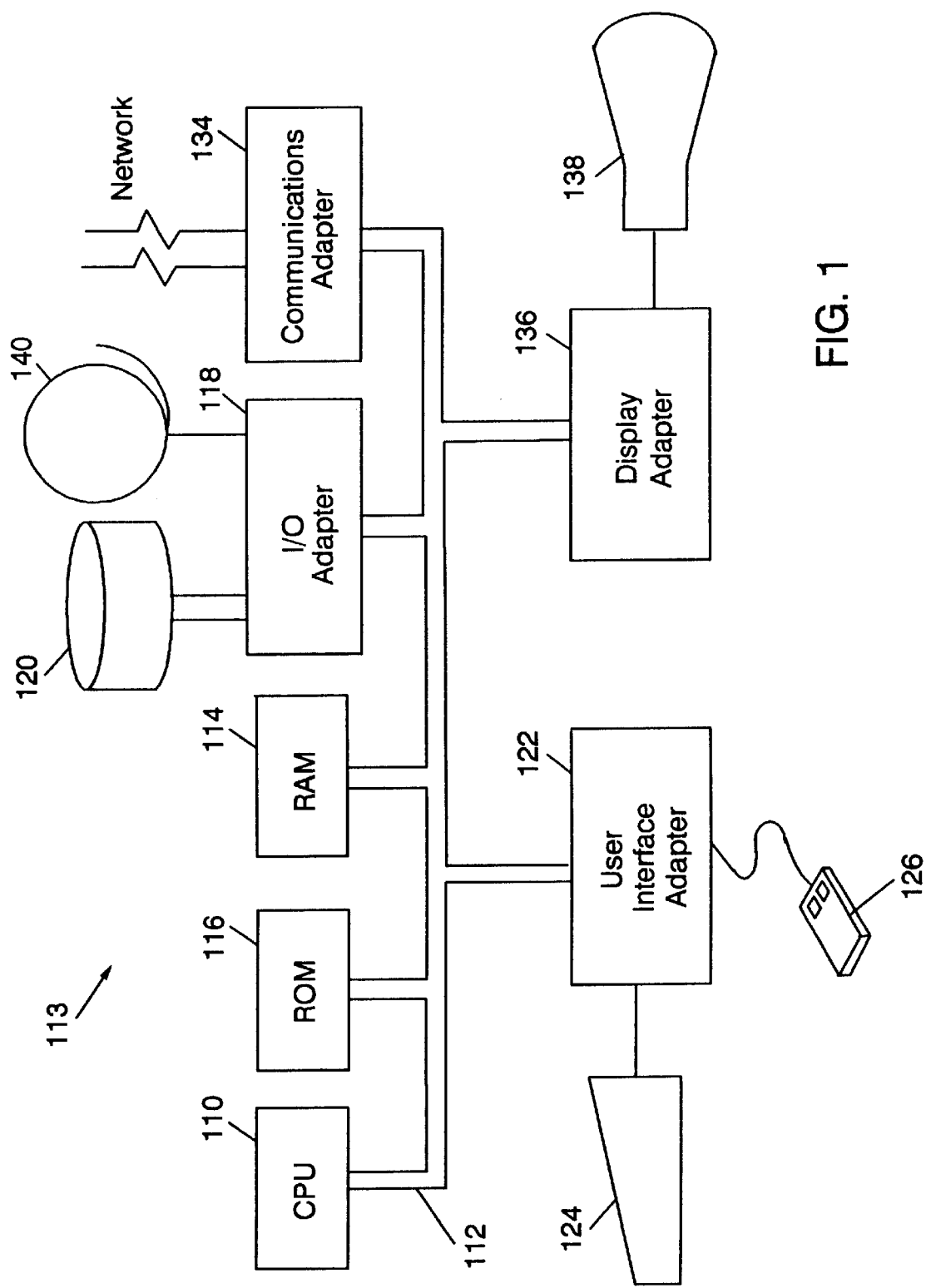
FIG. 1 illustrates a data processing system configured in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

Refer now to the drawings wherein depicted elements are not necessarily shown to scale and wherein like or similar elements are designated by the same reference numeral through the several views.

A representative hardware environment for practicing the present invention is depicted in FIG. 1, which illustrates a typical hardware configuration of workstation 113 in accordance with the subject invention having central processing unit (CPU) 110, such as a conventional microprocessor, and a number of other units interconnected via system bus 112. Workstation 113 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, and/or other user interface devices such as a touch screen device (not shown) to bus 112, communication adapter 134 for connecting workstation 113 to a data processing network, and display adapter 136 for connecting bus 112 to display device 138. CPU 110 may also reside on a single integrated circuit.

As the frequency of the CPU increases, the number of stages increases. To keep the execution units and the stages as full as possible, the number of outstanding instructions needs to be increased. As a result, the number of instructions dispatched each cycle needs to be increased. In a speculative, superscalar CPU design, machine states must be kept for each of the outstanding instructions. The more outstanding instructions, the more resources are needed to keep the states of the instructions. An example of the states that need to be saved are:

Register rename assignment

Instruction address

The states of each instruction are calculated and saved in the dispatch cycle. The process of calculating the state and then capturing the new state to save it for subsequent instructions being dispatched in the same cycle is a sequential process and is difficult in a high frequency design. This process currently limits the number of instructions to be dispatched in a cycle. An example of this limit is:

When an instruction is dispatched, the rename table must be updated with new physical pointers assigned to the register being updated by the instruction before a dependent instruction can access the rename table to obtain that pointer. Updating the rename table by an earlier instruction and then accessing it by a subsequent instruction in the same cycle is difficult to implement. To avoid this problem, a set of comparators can be implemented that compare all architected pointers of the source operands of subsequent instructions to all destination architected pointers of earlier instructions being dispatched in the same cycle. When a source architected pointer matches a destination architected pointer, the physical pointer being assigned to the destination architected register is selected as the physical pointer of the matched source thus bypassing the read access of the rename table. The number of comparators increases as the number of dispatched instructions increases. Furthermore, the loading on the architected destination pointer increases significantly as it is used to compare against all sources of subsequent instructions being dispatched in the same cycle. The bypass logic also becomes timing critical as the destination rename pointers need to be forwarded to more sources.

To provide a large number of instructions to be available for executions and to minimize the amount of resources being tied up by outstanding instructions, CPU 110 of the present invention dispatches instructions by group. The register rename assignment state as well as instruction address are saved per group of instructions. Furthermore, CPU 110 of the present invention dispatches multiple groups of instructions. Source to destination dependency between dispatched instructions is calculated for instructions within a group but not across groups that are being dispatched in the same cycle, thus eliminating the difficulty of detecting operand dependency and forwarding physical destination pointers to source pointers for a large number of instructions being dispatched in the same cycle.

Figure 2:
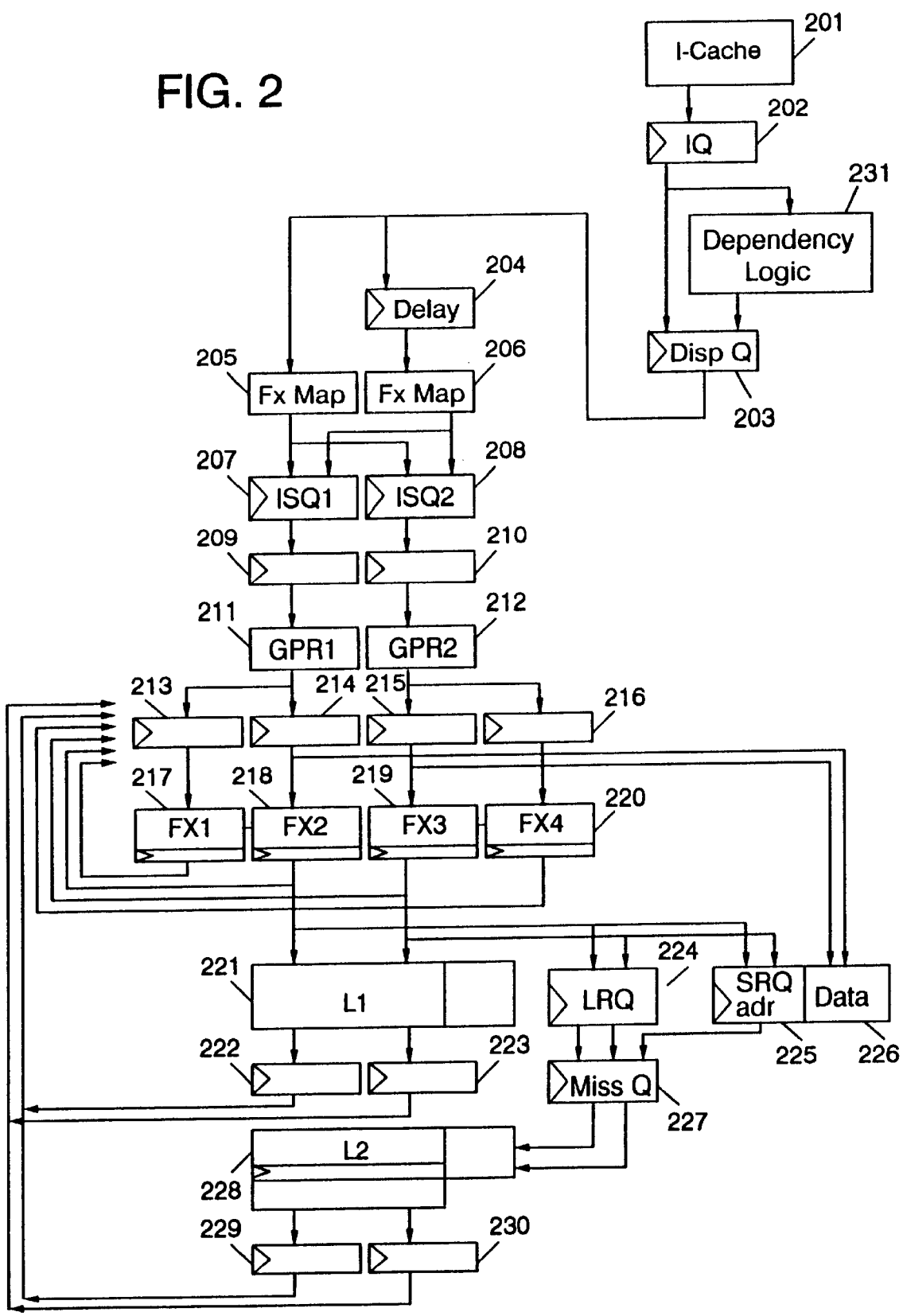
FIG. 2 illustrates portions of a processor configured in accordance with the present invention.

Referring first to FIG. 2, the following description describes an implementation for a Power PC fixed point instruction using a maximum of two source GPRs (RA and RB) and one update destination GPR (RT). However, the present invention may also be applied to the floating point units of a processor and/or to other processor architectures. It is implemented in CPU 110 having four fixed point units 217–220 (FX1, FX2, FX3, FX4), two of which also perform a load/store function. The rename scheme may be any known process for renaming. A group of instructions contains up to 5 instructions terminating with a branch instruction or four consecutive instructions. Two groups can be dispatched in a cycle. However, it should be noted that the present invention can be extended to support other types of instructions, groups with different numbers of instructions (other than five), and dispatching of more than two groups.

Instructions are fetched from instruction cache (I-cache) 201 into instruction queue (IQ) 202. Instructions from instruction queue 202 are formed into groups of instructions and then transferred to dispatch queue (Disp Q) 203. In this implementation, a group of instructions consists of 5 instructions with the fifth one being a branch instruction or a no-op.

The branch instruction is placed in the fifth slot. If there are less than four instructions before a branch then a no-op instruction is used to form a five instruction group. Up to two groups are transferred from instruction queue 202 to dispatch queue 203 each cycle. Each cycle, dependency information between each instruction within a group is calculated by the intra-group dependency logic 231. This information is tagged along with each instruction as it is transferred from IQ 202 to DQ 203. Typical dependency information is:

Source to destination dependency: a younger instruction uses the result generated by an older instruction;

Destination to destination collision: a younger instruction sets the same destination as an older instruction.

Instructions reside in issue queues (ISQ1, ISQ2) 207, 208 waiting to be issued to execution units 217, 218, 219, 220. When all operands of an instruction in issue queues 207, 208 are available, the instruction is eligible for issuing to the execution unit. Up to 4 instructions can be issued per cycle, one to each execution unit.

When instructions are issued, they are staged in registers 209, 210 so that their operands can be read from GPR 211, 212 into operands registers 213–216. Instructions are then executed by the execution units 217–220. If the instruction is a load instruction, then the L1 cache 221 is accessed and data is returned through registers 222–223. The load address is saved in LRQ 224 and is passed to MissQ 227 to access L2 cache 228 if the data is not in the L1 cache. Data from L2 cache 228 is returned through registers 229–230. If the instruction is a store, then store address and store data are maintained in SRQ registers 225–226 and written to L2 cache 228 through MissQ 227.

Figure 3:
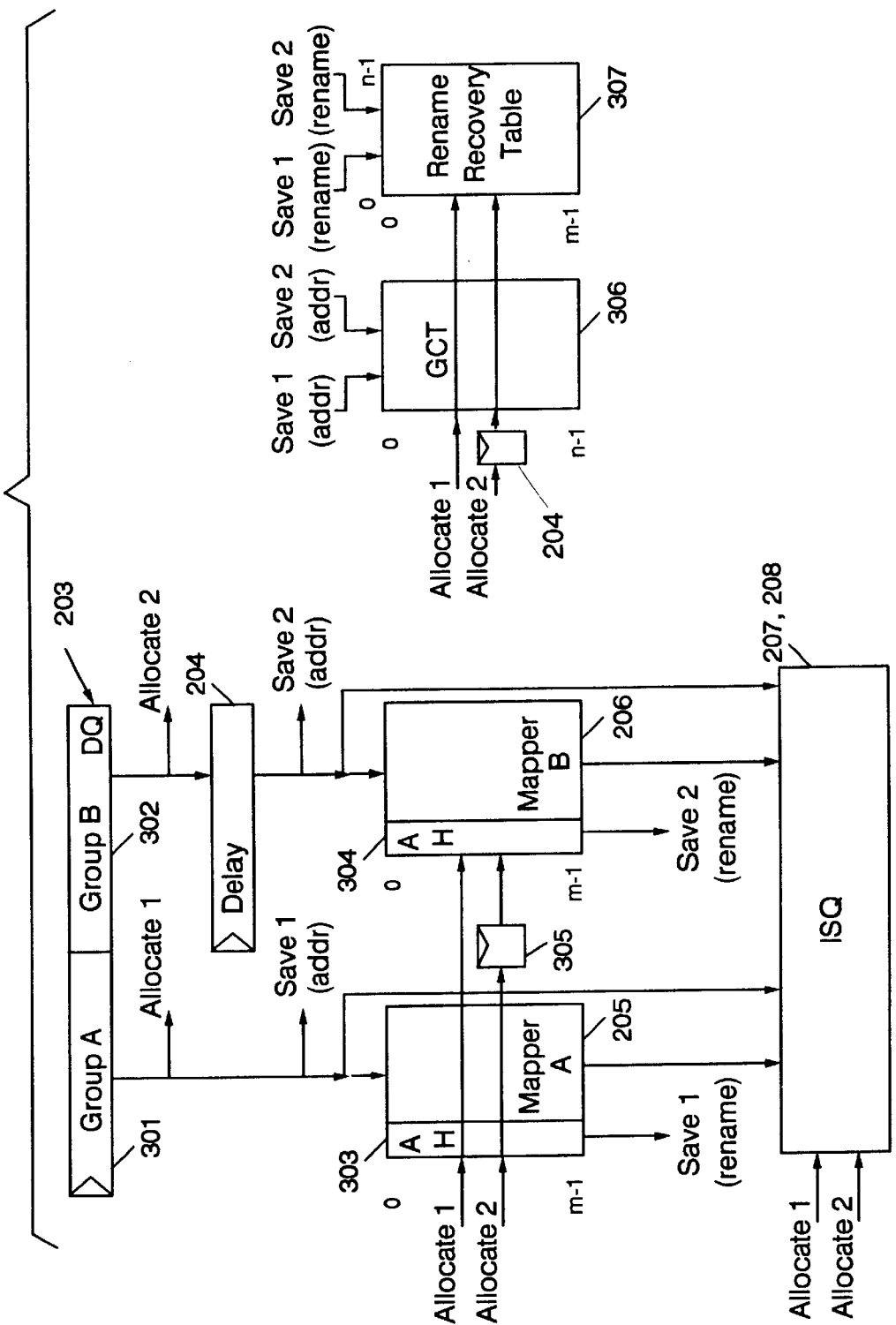
FIG. 3 illustrates a more detailed block diagram of the present invention.

FIG. 3 illustrates a high level flow of dispatched instructions in accordance with the present invention. Instructions are concurrently (a simultaneous occurrence of at least two or more events) dispatched in-order in two groups from the dispatch queue (DQ) 203. Group A 301 accesses rename table A (mapper A) 205 and then is in-gated into the issue queue (ISQ) 207, 208 in the same cycle as it is dispatched. Group B 302 is staged a cycle in the delay register 204, then accesses rename table B (mapper B) 206, and then is in-gated into the ISQ 207, 208 a cycle after it is dispatched. The instructions are then issued from the ISQ 207, 208 and then executed in the execution units 217–220 and then retired from the Global Completion Table (GCT) 306.

The following actions are performed before the instructions are in-gated into the ISQ 207, 208:

Global Completion Table 306 Allocation: an entry per instruction group is allocated (Allocate 1, Allocate 2) in the GCT 306 when the group is dispatched. Before groups of instructions are dispatched from DQ 203, all resources required for the instructions in these groups must be available. Typically the resources are:

1 GCT entry per group 1 register rename entry per destination register of each instruction 1 issue queue entry per instruction.

When a group of instructions is dispatched, these resources are allocated to the group or to the instructions within that group. Free entries from each resource (GCT, rename, issue queue, etc.) are tagged to receive information associated with the dispatched group or the instructions.

Allocation is performed at dispatch but the writing of information to the allocated entry may be delayed a cycle for group B.

Saving instruction information: the instruction address and necessary information of each group is saved in the allocated entry in the GCT 306. Group A 301 information is written into the GCT 306 in the cycle that it is dispatched from the DQ 203. Group B 302 information is staged a cycle in the delay register 204 and written into the GCT 306 a cycle after it is dispatched from the DQ 203. Mapper states are saved in the rename recovery table 307. Recovery table 307 has n entries which corresponds to the number of entries in GCT 306. Each entry in recovery table 307 contains 2 vectors, each vector has m bits which correspond to the number of entries in mappers 205, 206. The A Vector 303 of mapper 205 is saved in the Ra vector in recovery table 307 at the entry allocated for the dispatched groups 301, 302.

The RH vector in recovery table 307 is set to indicate which instructions in the dispatched groups 301, 302 set destination registers. The RH vector is saved in recovery table 307 at the entry allocated for the dispatched groups 301, 302.

The state 303 of mapper 205 and the destination register requirement (RH vector) of group 301 is saved in the cycle group 301 is dispatched from DQ 203. The state 304 of mapper 206 and the destination register requirement (RH vector) of group 302 is saved in the cycle after group 302 is dispatched from DQ 203.

Mapper 205,206 are implemented as a Content Addressable Memory (CAM). The architected pointer of a register is stored in the mapper. The A Vector of mapper 205, 206 indicates which entry in the mapper is the most recently allocated register (there is one active A bit per architected register). For example, for the 32 architected GPR there are 32 active A bits in mapper 205, 206. An active H bit indicates that the entry is being held until the instruction that set this physical destination register has completed. The A and H bits for each entry indicate the state of that entry as follows:

A H 0 0 Free 1 0 Most recent mapping of the architected register 0 1 Not the most recent mapping of the architected register but need to hold until the instruction is completed.

1 1 Don't care

The physical pointer is obtained by comparing the architected pointer of an incoming instruction against the content of the table. The location which has an active A bit and produces an equal compare between the incoming architected pointer and the content of the table is the physical pointer.

Mapper Allocation: when an instruction that sets a destination register is dispatched, a new rename register is allocated to the instruction as follows:

The architected pointer of the destination register of the dispatching instruction (RT field) is compared against all entries in the mapper. At the location where the A bit is active and the architected pointer of the destination register of the instruction matches the content of the mapper, reset the A bit and set the H bit. That is, the AH state at this location goes from 10 (most recent mapping) to 01 (held).

At a free entry (AH=00), write the architectured pointer of the destination register (RT field) of the dispatching instruction into the mapper. Set the A bit at that location to 1. That is, the AH state at this location goes from 00 (free) to 10 (most recent mapping). Typically, free entries are detected by checking the AH state (AH=00) and save in a free list (i.e., free list 401 in FIG. 4).

For groups of instructions, new physical pointers are allocated to the destination GPR of each instruction in each group. Mapper A 205 is allocated for both groups 301, 302 in the dispatch cycle. Mapper B 206 is allocated for group A 301 in the dispatch cycle and for group B 302 in the cycle after dispatch due to delay register 305. If multiple instructions in the 2 groups being dispatched set the same architected register (same RT field) then A cycle after both groups are dispatched from DQ 301, 302 mapper 205 allocation will reflect that the physical location associated with the destination register of the youngest instruction of both groups 301, 302 be the "most recent mapping" state and the other physical location associated with the identical destination registers of both groups 301, 302 be in the "held" state. Comparators 637–652 are used to compare the architected destination field (RT field) of instructions between the 2 groups. This comparison function is performed at the time the group is formed during the dispatch cycle. The results of these comparisons and the destination to destination collision information within each group are used to perform the allocation function.

A cycle after both groups are dispatched from DQ 301, 302, mapper 206 allocation will reflect that the physical location associated with the destination register of the youngest instruction of group 301 be the "most recent mapping" state and the other physical location associated with the identical destination registers of group 301 be in the "held" state.

Source pointers for each source of the instructions are translated into a physical pointer by looking up the mapper. The sources for group A 301 are translated in the dispatch cycle (read access from DQ 203), the sources for group B 302 are translated a cycle after dispatch (read access from delay register 204). Note that source-destination dependency within a group is covered by bypassing the new allocated physical pointer to the dependent source. Also note that there is no need to check for source-destination dependency between groups.

ISQ ingate: the instructions, the allocated destination pointers, and the source physical pointers are in-gated into the ISQ 207, 208. Group A is in-gated in the dispatch cycle, group B is in-gated a cycle after dispatch.

Figure 4A:
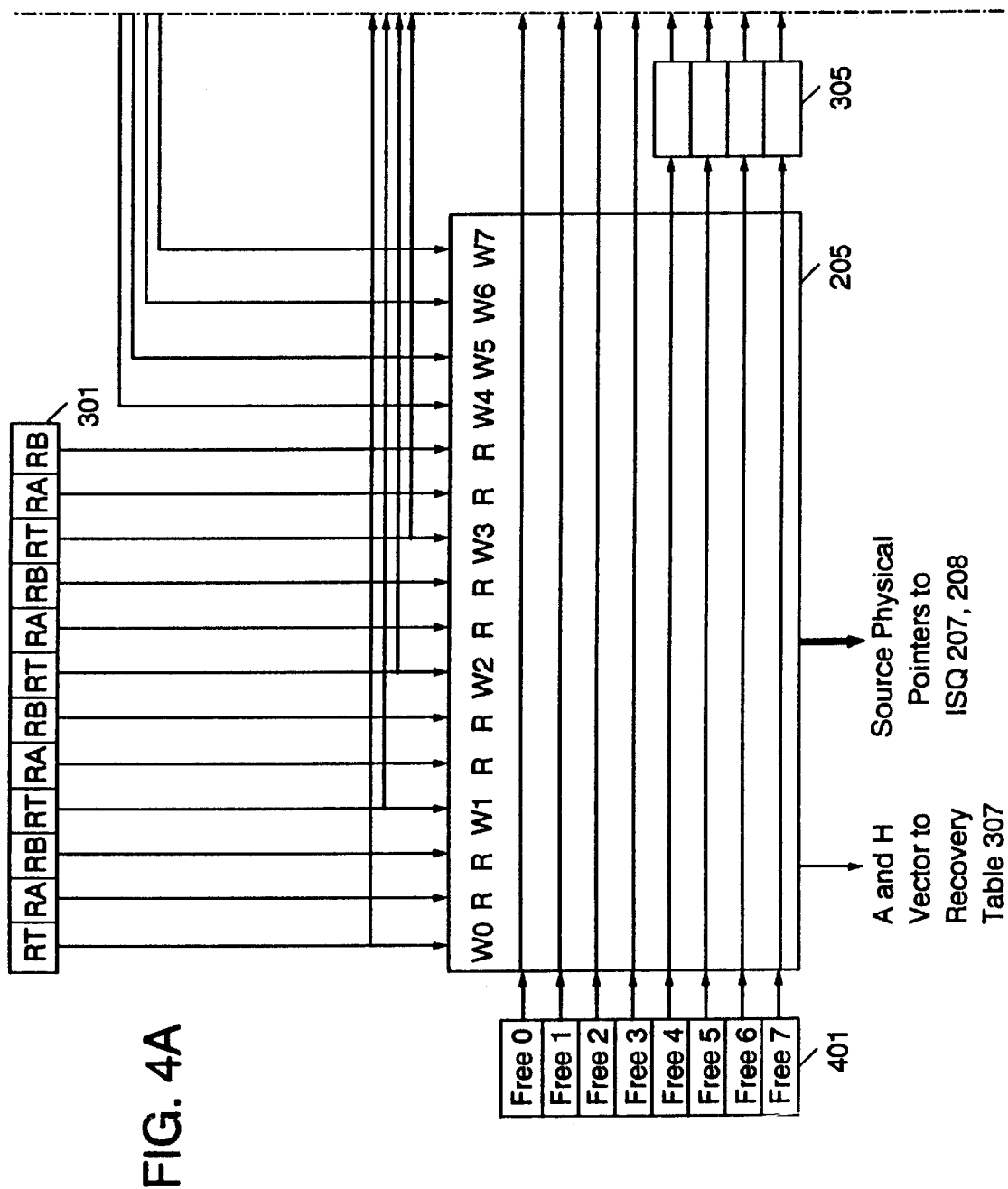
FIGS. 4A and 4B illustrate further detail of the rename tables configured in accordance with the present invention.
Figures 4, 4A, 4B:
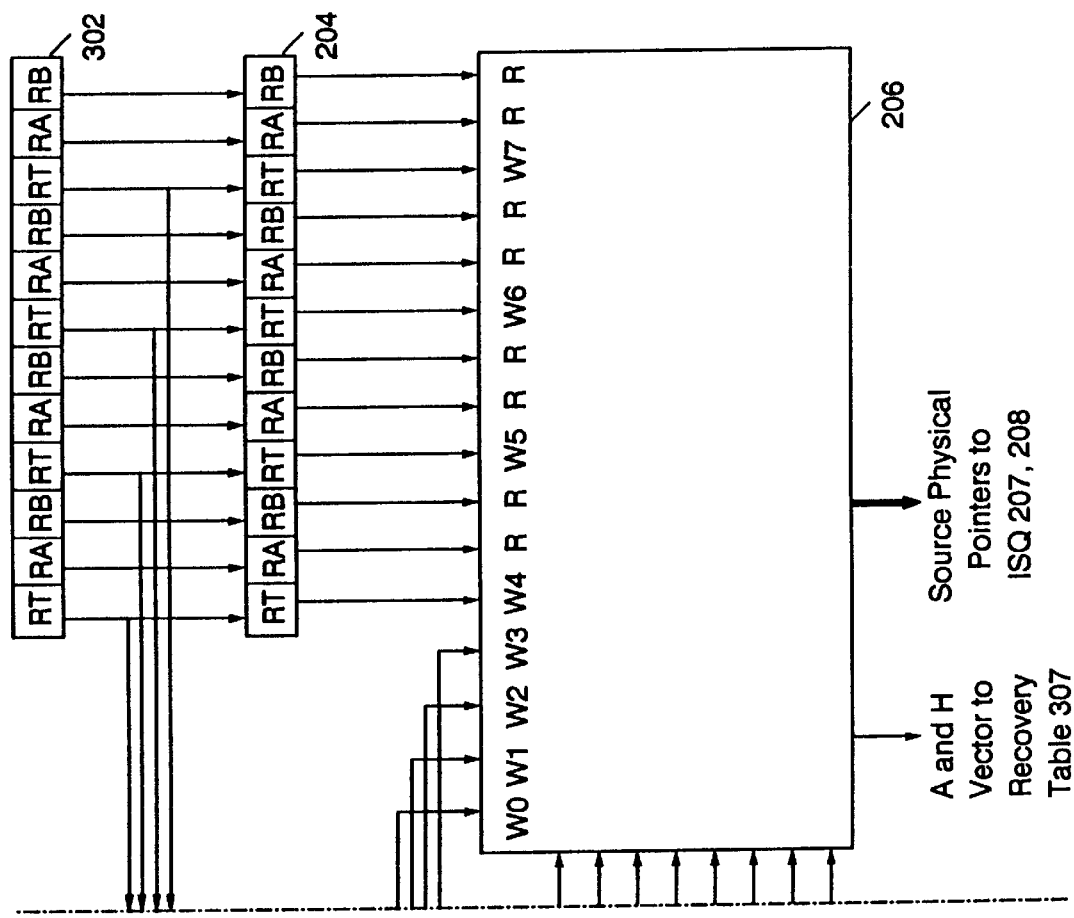

FIG. 4 illustrates in further detail the allocation of resources into mappers 205 and 206 as group A 301 and group B 302 are dispatched. The destination register of each instruction of both groups are allocated into mapper 205. Free list 401 provides the free locations of the mapper that the new destinations are allocated. Free entries are put into the free list 401 by examining the A and H vectors of mapper 205 by selecting 8 free entries (AH=00). Free entries 0–7 are for instructions 0–7. Port WO-W7 of mapper 205 is used to write the RT field of dispatching instruction as well as setting the A and H vectors. The destination register of each instruction of group A is allocated into mapper 206 at the same time as instructions in group A are allocated into mapper 205. Free list 401 entries 0–3 are used. Destination register of each instruction of group B are allocated into mapper 206 a cycle later through delayed registers 204, 305. Since the same free list 401 is used for the allocation of both mappers, the state of mapper 206 is the same as the state of mapper 205 for instructions in group A. Furthermore, after a cycle delay, the state of mapper 206 is the same as the state of mapper 205 for instructions in group B. After allocation, mapper 205 reflects the effect of both dispatched groups, and mapper 206 reflects the effect of dispatched group A but not group B.

Figure 5:
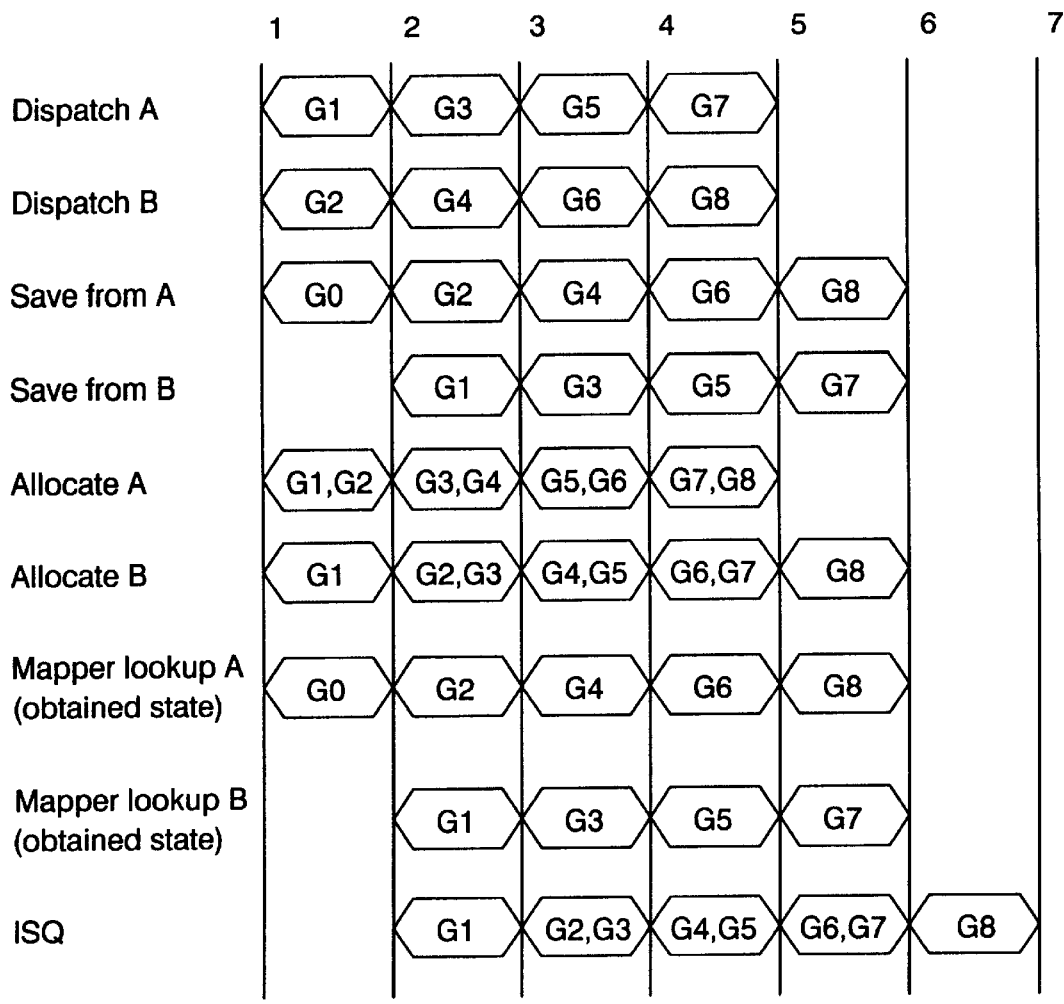
FIG. 5 illustrates a timing diagram in accordance with the present invention.

FIG. 5 shows the timing of a dispatch sequence. In cycle 1, group 1 is dispatched from DQ 301, and group 2 is dispatched from DQ 302. Before allocation is performed, the current rename state (A vector and RH indication vector), G0, from mapper A 205 is saved in Recovery Table 307. Architected source registers from instructions in group 1 from DQ 301 are translated into physical registers by performing source lookup from mapper A 205. Group 1 will obtain the register state G0. Furthermore, group 1 and group 2 are allocated in mapper A 205. Likewise, group 1 is allocated in mapper B 206.

In the next cycle (cycle 2), mapper A 205 state G2 reflects the fact that group 1 and group 2 have dispatched. Mapper B 205 state G1 reflects the fact that group 1 has dispatched. Since the allocation group 2 is delayed a cycle through stage 204 and 305, mapper B 206 does not reflect the state of dispatched group 2 yet (state G2). As the third and fourth groups are dispatched, the rename state G2 from mapper A 205 is saved in rename recovery table 307 while the rename state G1 from mapper B 206 is saved in recovery table 307. Architected source register from instructions in group 3 from DQ 301 are translated into physical register by performing source lookup from mapper A 205. Group 3 will obtain the register state G2 which were allocated by group 2 dispatched in the previous cycle (cycle 1). Group 2 is now in stage 204 which is delayed a cycle from DQ 203. Architected source registers from instructions in group 2 from stage 204 are translated into physical registers by performing source lookup from mapper B 206. Group 2 will obtain the register state G1 which was allocated by group 1 dispatched in the previous cycle (cycle 1). Furthermore, group 3 and group 4 are allocated in mapper A 205. Likewise, group 2 from stage 204 and group 3 from DQ 301 are allocated in mapper B 206. Information allocated and obtained for group 1 in the previous cycle now appear in ISQ 207, 208.

In cycle 3, mapper A 205 state G4 reflects the fact that group 3 and group 4 have dispatched. Mapper B 205 state G3 reflects the fact that group 3 has dispatched. Since the allocation group 4 is delayed a cycle through state 204 and 305, mapper B 205 does not yet reflect the state of dispatched group 4 (state G4). As the fifth and sixth groups are dispatched, the rename state G4 from mapper A 205 is saved in rename Recovery Table 307 while the rename state G3 from mapper B 206 is saved in Recovery Table 307. Architected source registers from instructions in group 5 from DQ 301 are translated into physical registers by performing source lookup from mapper A 205. Group 5 will obtain the register state G4 which were allocated by group 4 dispatched in the previous cycle (cycle 2). Group 4 is now in stage 204 which is delayed a cycle from DQ 203. Architected source registers from instructions in group 4 from stage 204 are translated into physical registers by performing source lookup from mapper B 206. Group 4 will obtain the register state G3 which were allocated by group 3 dispatched in the previous cycle (cycle 2). Furthermore, group 5 and group 6 are allocated in mapper A 205. Likewise, group 4 from stage 204 and group 5 from DQ 301 are allocated in mapper B 206. Information allocated and obtained from group 2 and group 3 in the previous cycle now appear in ISQ 207, 208.

The process repeats in subsequent cycles for subsequent dispatched groups.

In general the following actions are performed to complete instructions. GCT 306 waits until all instructions in a group have executed. When all instructions in the group have finished executing and there is no exception the group is completed in the order that it is dispatched. When a group completes, GCT 306 sends the group tag (complete GTAG) of the completed group to rename Recovery Table 307. The RH vector at the location pointed to by the complete GTAG is read out and is sent to mapper 205, 206. At any active bit of the RH vector, the H bit in mapper 205, 206 is reset thus freeing up the physical entries associated with the completed instructions.

When speculative instructions need be discarded the exception (such as branch mispredict or exception condition) is reported to GCT 306 along with a tag (flushed group tag or flushed GTAG) that identifies the group that causes the exception. GCT 306 then forms a flush mask of n bits with k (k less than or equal to n) active bits to indicate which k groups of instructions need be aborted. This mask is broadcast to all units in the processor. GCT 306 also sends the flushed GTAG to rename Recovery Table 307. Rename recovery table 307 reads the A vector at the flushed GTAG location and restored it to A bit vector or mapper 205, 206. Simultaneously, all RH vectors associated with active bits of the flush mask are read from rename recovery table 307. All read RH vectors are then "ORed" bit wise to form an m bit vector which is sent to mapper 205, 206. At any active bit of this vector the H bit in mapper 205, 206 is reset thus freeing up the physical entries associated with the flushed instructions.

Figures 6, 6A:
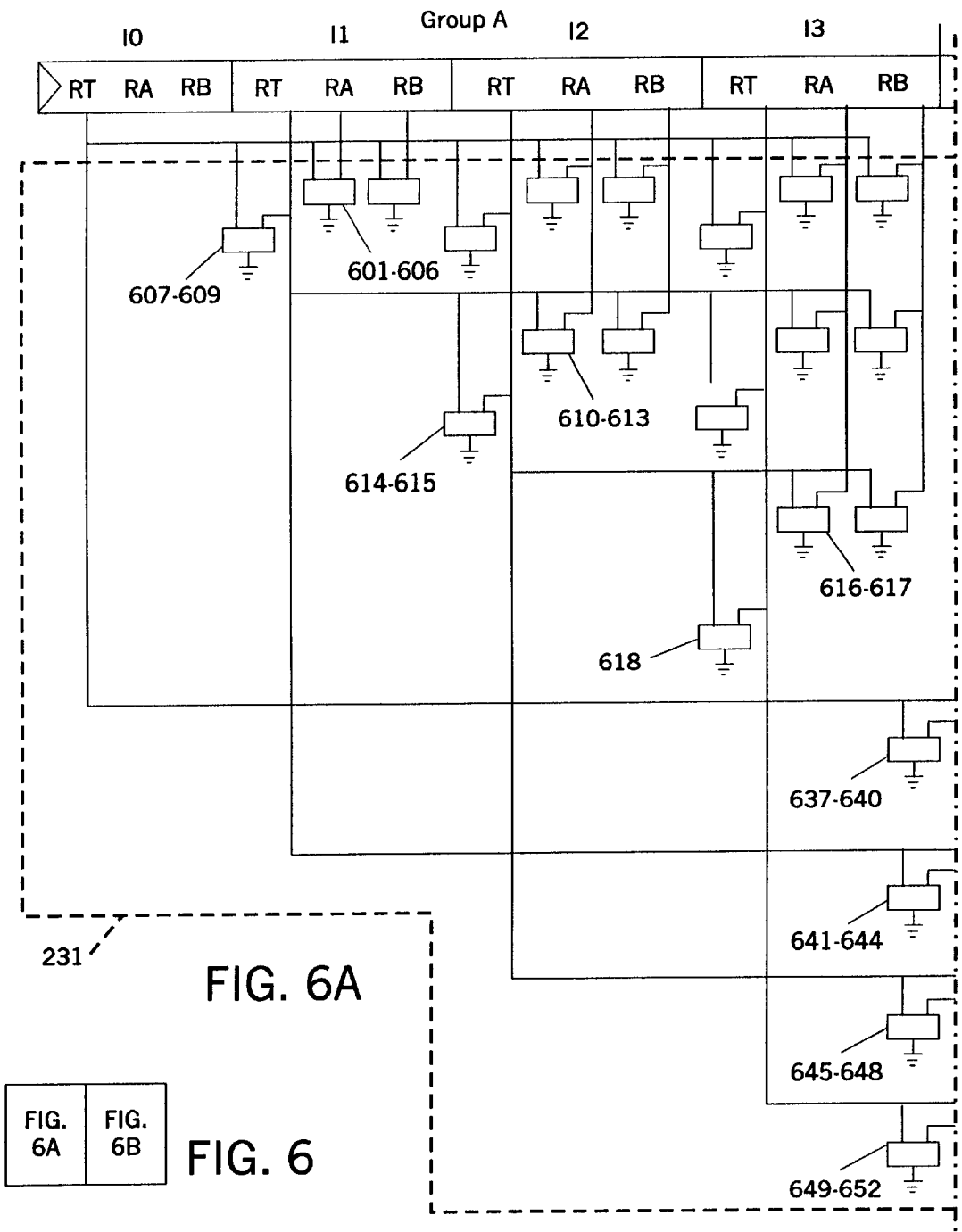
FIGS. 6A and 6B illustrate circuitry for performing an instruction dependency calculation.
Figure 6B:
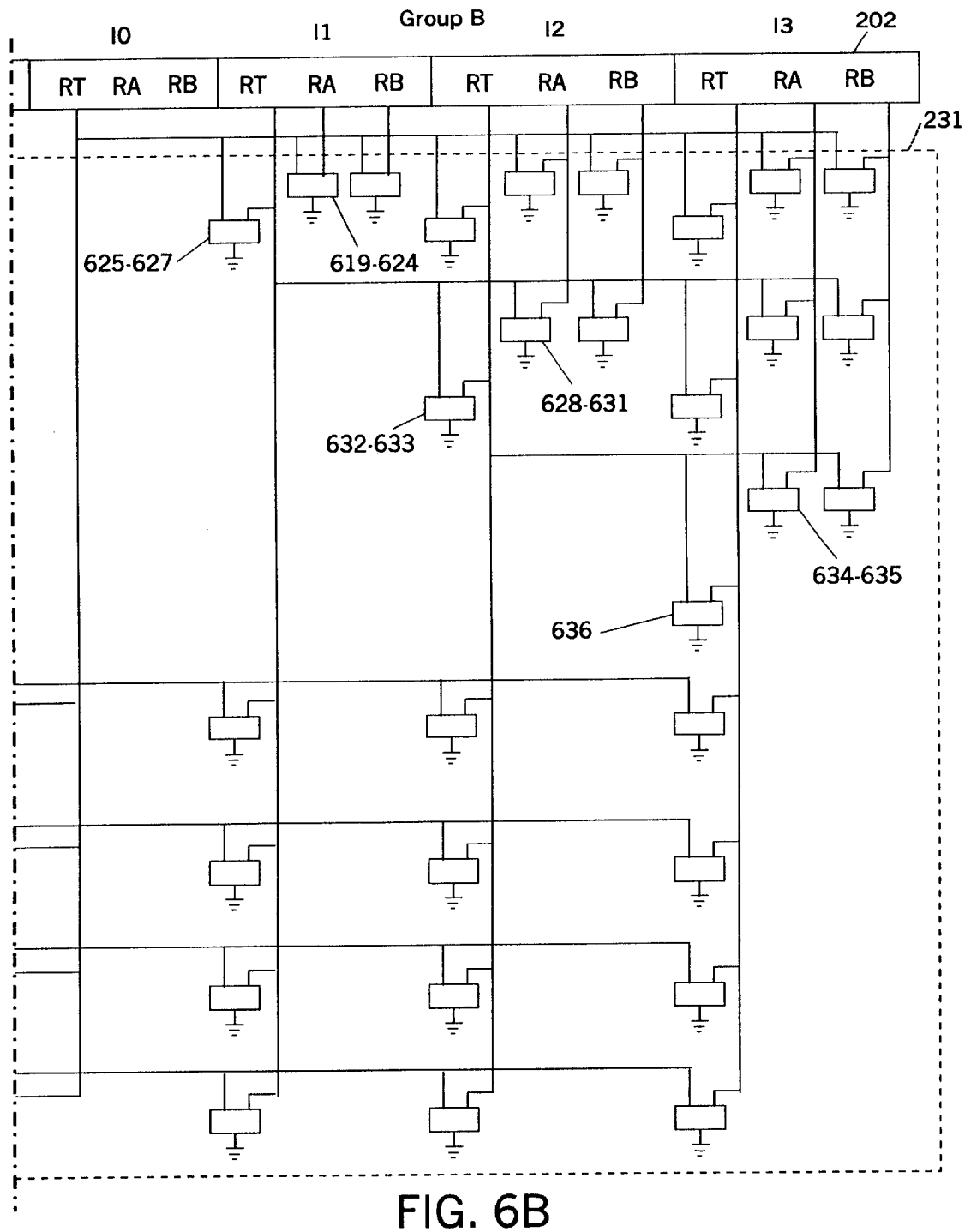

FIG. 6 shows the instruction dependency calculation. I0 is the oldest instruction in the group, I1 is the second oldest, etc.

Within group A, source architected pointers RA and RB for instructions I1, I2, I3 are compared against the destination architected pointer RT and I0 using comparators 601–606. The result indicates source-to-destination dependency for I1, I2 and I3 with respect to I0.

Likewise, source architected pointers RA and RB for instructions I2, I3 are compared against the destination architected pointer RT of I1 using comparators 610–613. The result indicates source-to-destination dependency for I2 and I3 with respect to I1.

Likewise, source architected pointers RA and RB for instruction I3 are compared against the destination architected pointer RT of I2 using comparators 616–617. The result indicates source-to-destination dependency for I3 with respect to I2.

Independently, the source-to-destination dependency is calculated for instructions in group B using comparators 619–624, 628–631, 634–635. The destination-to-destination collision between instructions is calculated using comparators 607–609, 614–615, 618 for group A, 625–627, 632–633, 636 for group B, and 637–652 for instructions between group A and group B.

The results of the comparison are transferred with the instructions to DQ 203 and used by rename mapper 205, 206 to allocate new entries as well as forwarding destination pointers to source pointers for dependent instructions with the same group.

Although the present invention and its advantages have been described in detail, it should be understood that various changes, substitutions and alterations can be made herein without departing from the spirit and scope of the invention as defined by the appended claims.

What is claimed is:

1. A processor comprising:
   a plurality of execution units;
   a dispatch queue operable for concurrently dispatching a plurality of groups of instructions to be executed by the plurality of execution units;
   a plurality of rename tables, wherein a rename table is associated with each group, wherein a first one of the plurality of groups is mapped by a first one of the plurality of rename tables in a first cycle, and wherein a second one of the plurality of groups is mapped by a second one of the plurality of rename tables in a second cycle subsequent to the first cycle; and a delay register coupled between a portion of the dispatch queue dispatching the second one of the plurality of groups and the second one of the plurality of rename tables.

2. The processor as recited in claim 1, wherein each of the plurality of groups of instructions contains a plurality of instructions.

3. A processor comprising:

a plurality of execution units;

a dispatch queue operable for concurrently dispatching a plurality of groups of instructions to be executed by the plurality of execution units; and a plurality of rename tables, wherein a rename table is associated with each group, wherein a first and second one of the plurality of groups is allocated to a first one of the plurality of rename tables in a first cycle, and wherein the first one of the plurality of groups is additionally allocated to the second one of the plurality of rename tables in the first cycle, and wherein the second one of the plurality of groups is allocated to the second one of the plurality of rename tables in a second cycle subsequent to the first cycle.

4. A processor comprising:

a plurality of execution units;

a dispatch queue operable for concurrently dispatching a plurality of groups of instructions to be executed by the plurality of execution units; and a plurality of rename tables, wherein a rename table is associated with each group, wherein a first one of the plurality of groups is mapped by a first one of the plurality of rename tables in a first cycle, and wherein a second one of the plurality of groups is mapped by a second one of the plurality of rename tables in a second cycle subsequent to the first cycle.

5. A processor comprising:

a plurality of execution units;

a dispatch queue operable for concurrently dispatching a plurality of groups of instructions to be executed by the plurality of execution units;

a plurality of rename tables, wherein a rename table is associated with each group; and a plurality of comparators for determining source-to-destination dependency for each instruction within each of the plurality of groups, wherein an output of the plurality of comparators is received by the dispatch queue.

6. In a processor, a method comprising the steps of:

retrieving a plurality of instructions for execution by a plurality of execution units;

grouping the plurality of instructions into first and second groups wherein each group contains a plurality of instructions;

concurrently dispatching the first and second groups of instructions to the plurality of execution units;

mapping the first group in a first rename table;

mapping the second group in a second rename table; and delaying the mapping of the second group in the second rename table until a cycle subsequent to the cycle in which the first group is mapped in the first rename table.

7. The method as recited in claim 6, further comprising the steps of:

saving a state of the first rename table in a rename recovery table; and saving a state of the second rename table in the rename recovery table.

8. The method as recited in claim 6, further comprising the step of:

comparing a source architected pointer of a first one of the plurality of instructions with a destination architected pointer of a second one of the plurality of instructions.

9. The method as recited in claim 6, further comprising the step of:

comparing destination architected pointers of instructions within each group.

10. In a processor, a method comprising the steps of:

retrieving a plurality of instructions for execution by a plurality of execution units;

grouping the plurality of instructions into first and second groups, wherein each group contains a plurality of instructions;

concurrently dispatching the first and second groups of instructions to the plurality of execution units; and comparing destination architected pointers of an instruction in the first group with an instruction in the second group.

11. A processor comprising:

an instruction cache operable for retrieving a plurality of instructions;

a dispatch queue operable for grouping the plurality of instructions into first and second groups, wherein each group contains a plurality of instructions;

a first rename table operable for mapping the first group;

a second rename table operable for mapping the second group;

a delay register coupled between the dispatch queue and the second rename table;

an instruction issue queue coupled to the dispatch queue; and a plurality of execution units coupled to the issue queue, wherein the first and second groups of instructions are dispatched concurrently by the dispatch queue.

12. The processor as recited in claim 11, wherein the first group is mapped by the first rename table in a first cycle, and wherein the second group is mapped by the second rename table in a second cycle subsequent to the first cycle.

13. The processor as recited in claim 12, further comprising a rename recovery table operable for storing states of the first and second rename tables.

14. The processor as recited in claim 12, wherein the first and second groups are allocated to the first rename table in a first cycle, and wherein the first group is additionally allocated to the second rename table in the first cycle, and wherein the second group is allocated to the second rename table in a second cycle subsequent to the first cycle.

* * * * *